C. FRITZ.
LIQUID MEASURE.
APPLICATION FILED FEB. 1, 1912.
1,090,607.
Patented Mar. 17, 1914.
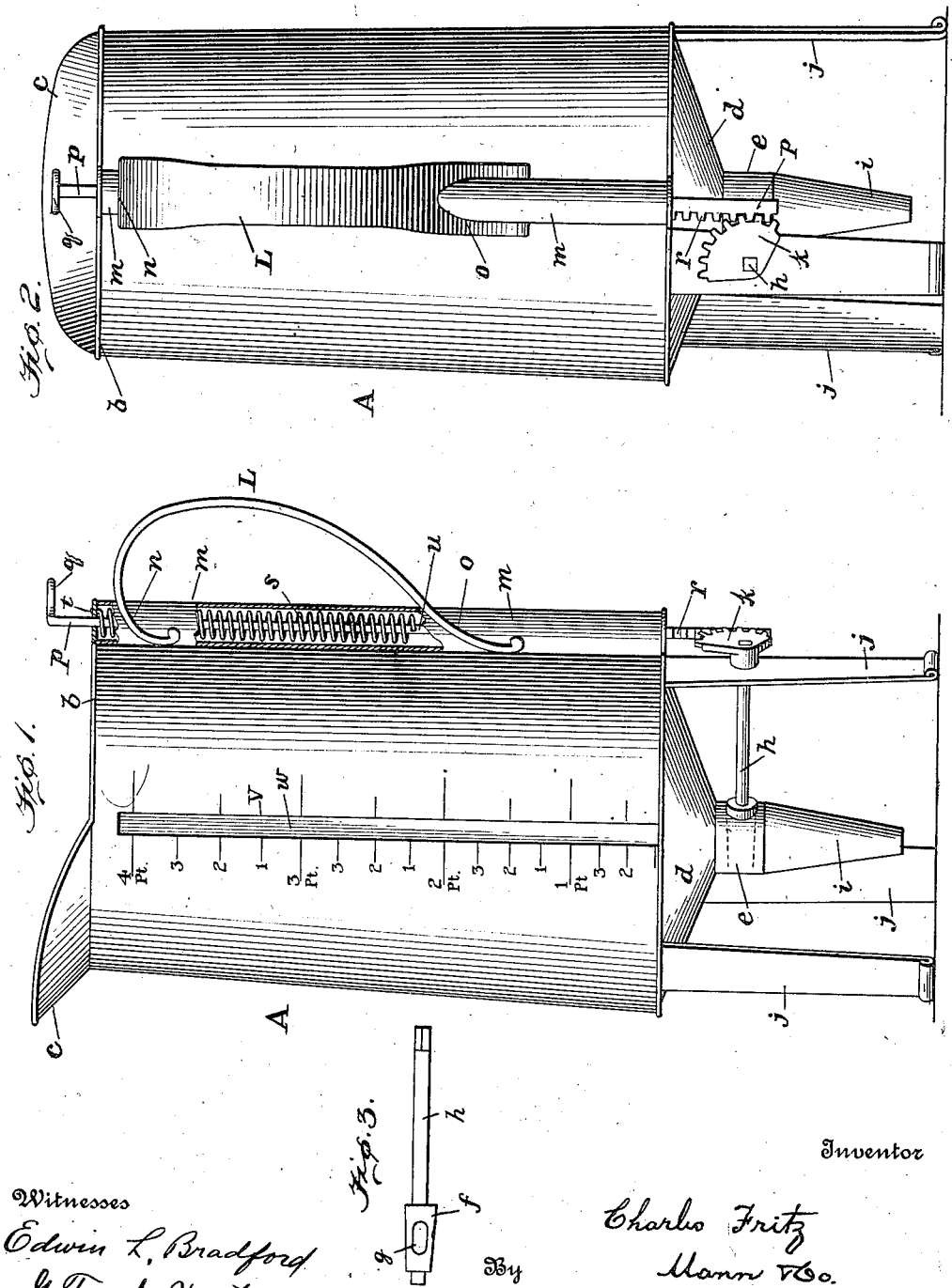
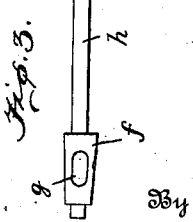
Witnesses
Edwin L. Bradford
G. Ferd. Vogt
Inventor
Charles Fritz
Mann & Co.
Attorneys

UNITED STATES PATENT OFFICE.

CHARLES FRITZ, OF BALTIMORE, MARYLAND.

LIQUID-MEASURE.

1,090,607. Specification of Letters Patent. Patented Mar. 17, 1914.

Application filed February 1, 1912. Serial No. 674,659.

*To all whom it may concern:*

Be it known that I, CHARLES FRITZ, a citizen of the United States, residing at Baltimore, in the State of Maryland, have invented certain new and useful Improvements in Liquid-Measures, of which the following is a specification.

This invention relates to improvements in vessels for measuring liquids.

The improved measure is shown in the accompanying drawing and the features constituting the invention are hereinafter described and then claimed.

Figure 1 is a view of the measure showing the side of the glass gage and a section of the tube that incloses the spring and rod. Fig. 2 is an elevation of the measure showing how the tube extends through the handle. Fig. 3 is a view of the valve detached.

The body, A, of the measure should be made of suitable sheet-metal, and at its top rim, $b$, may have an ordinary lip, $c$, to facilitate pouring liquid by tilting the measure in case such should be required.

It is the intention that ordinarily the liquid shall be discharged from the bottom of this measuring vessel, and to this end a sort of hopper-shaped bottom, $d$, is provided. An ordinary cylindric valve or spigot case, $e$, is fixed to the said bottom, and a slightly-tapered plug, $f$, having a diametrical hole, $g$, through it, fits crosswise in said cylindric case, $e$, and an axial stem, $h$, extends horizontally from said plug. A tapered discharge nozzle, $i$, is attached to the cylindric case below the valve and projects downward; the end of this nozzle may be inserted into any vessel, or into a bottle. It will be understood from the valve structure that is shown and described, that a quarter-turn given to the valve-plug, $f$, will either open the valve to allow liquid to pass through the hole, $g$, to discharge, or close the valve to cut-off the flow of liquid.

The body of the measure is supported in an elevated position on suitable standards or feet, $j$; this elevated position keeps the lower end of the pendant nozzle, $i$, above the top of the table, counter or shelf on which the measure may be resting. The valve-stem, $h$, extends from the case, $e$, to one of the said supporting standards, $j$, which has a hole through which the said stem extends; this hole constitutes a bearing for the stem. The end of the stem carries a quadrant segment gear, $k$. A loop-shaped handle, L, suitable to be grasped by the four fingers of a person's hand, has its upper end attached to the body, A, near its top-rim, and therefrom the handle curves away from the body and then downward and its lower end is attached to the body. A vertical tube, $m$, is mounted on the outside of the body or vessel, A, and said tube extends from the top rim, $b$, to the bottom, and also extends through a hole at, $n$, in the top of the said handle, and through a slot at, $o$, in the lower end of the handle. This construction enables the tube, $m$, to be placed outside of the vessel where it will have no contact with the liquid, and to have such position relative to the handle, L, that the rod, $p$, may be operated by the thumb of the same hand whose fingers grasp the handle, L. The rod, $p$, extends vertically through the tube, $m$, its upper end projects above the top of the tube and has a thumb-piece, $q$; its lower end has on one side teeth, $r$, that form a rack which engages with the quadrant gear, $k$, that produces a quarter-turn of the valve-plug, $f$. A spiral spring, $s$, is in the tube, $m$, and surrounds the rod, $p$; one end of this spring is fastened at, $t$, in the upper end of the tube and the lower end of the spring is fastened at, $u$, to the rod. Normally the tension of the spring keeps the rod, $p$, to its raised position, and at such raised position of the rod the valve-plug, $f$, will be closed. When pressure is applied to the upper end of the rod, $p$, the spring, $s$, will yield and distend, the rod will move down and the rack, $r$, acting on the quadrant, $k$, will produce a quarter-turn of and open the valve-plug, $f$, and thereupon any liquid in the vessel, A, will discharge from the nozzle, $i$; releasing down-pressure on the rod the action of the spring, $s$, will automatically raise the rod and turn the valve, $f$, to its closed position.

The side of the vessel has a vertical slot, $v$, which is closed by a glass plate, $w$, and along the slot are graduating marks and characters denoting pints and gills; in the present instance the vessel is marked to contain four pints.

Having thus described my invention what I claim and desire to secure by Letters Patent is,—

The combination with a vessel having a depending discharge-nozzle in its bottom of supporting legs around the nozzle and depending from the periphery of the vessel; a valve extending crosswise of the nozzle and having a horizontal stem whose outer end projects through and has bearing in one of the supporting legs; a segment gear on the end of the stem and at the outer side of the leg in which the stem has bearing; a vertical tube on the exterior of the vessel directly above the periphery of the segment gear; a vertical rack-bar depending from the tube and projecting downwardly at the leg which sustains the gear-stem and engaging said gear, and a handle attached to the vessel in alinement with the rack-bar.

In testimony whereof I affix my signature in presence of two witnesses.

CHARLES FRITZ.

Witnesses:
PETER WIDRO,
NETTIE MARTIN.